June 5, 1951 R. PASQUET 2,555,897

AUTOMATIC PHOTOGRAPHIC ENLARGING APPARATUS

Filed March 20, 1946

INVENTOR
Robert Pasquet
By *Richard de Geen*
Attorneys

Patented June 5, 1951

2,555,897

UNITED STATES PATENT OFFICE 2,555,897

AUTOMATIC PHOTOGRAPHIC ENLARGING APPARATUS

Robert Pasquet, Dammarie-les-Lys, France

Application March 20, 1946, Serial No. 655,858
In France March 17, 1945

Section 1, Public Law 690, August 8, 1946
Patent expires March 17, 1965

1 Claim. (Cl. 88—24)

The present invention relates to an automatic photographic enlarging apparatus of the kind in which the enlarging assembly, comprising a light box, a negative holder and an object glass, is journalled on the arms of a parallelogram and is adapted to be moved towards or away from the projection surface for obtaining, with the aid of suitable apparatus, an automatic setting.

The invention consists in obtaining in such apparatus, both extreme simplicity in the construction of the apparatus, an exact adjustment of focal distances by simple and robust apparatus and on the other hand, of providing by a cinematic connection with the deformable parallelogram, the adjustment of the projection table or platform.

To obtain a predetermined enlarging ratio, it is necessary to adjust simultaneously several settings; according to the invention, the variation of the focal distances and of the centre of the projection platform is realised by completely automatic means without any manual setting operation.

Automatic setting enlargers are known in which the displacement of the projector assembly brings about, by the action of a cam, the displacement of the object glass relatively to the negative-holder, to such a degree that the setting may be kept constant no matter what the enlarging ratio may be, the cams either being fixed to the arms of a parallelogram, or controlled by a pair of conical gears, a worm or the like.

One of the principal features of the present invention consists in arranging a cam on one of the pivot pins of the parallelogram and in connecting it by a rod to the opposite arm of the parallelogram at a desired predetermined position, which is geometrically located in the longitudinal axis of this arm.

The cam is thus displaced at the same time as the negative and makes an increased rotary movement in relation to the lever arms and adjusts the object glass carrier through a roller.

The second particular characteristic feature of the invention resides in that the projection platform is made movable and rotatable in its own plane, this movement being effected mechanically by the movements of the parallelogram.

The main advantages which result from each of the new arrangements are:

(1) A cam may have a profile which increases slowly, due to its increased angular displacement, and this flow variation of the radius of curvature at the different points of contact with the roller rigid with the object glass, thus permits of a smooth rolling action of the roller on the cam.

(2) A projection platform movable and rotatable in its own plane, permits the centre of the table being kept perpendicular to the optical axis of the projector, no matter what the position of the parallelogram may be, which arrangement has never been realised before to my acknowledge.

(3) In the drawings attached hereto as an example only, where the same numerals designate the same elements or pieces, the figures show forms of execution of an automatic enlarging apparatus in accordance with the invention.

Figure 1:
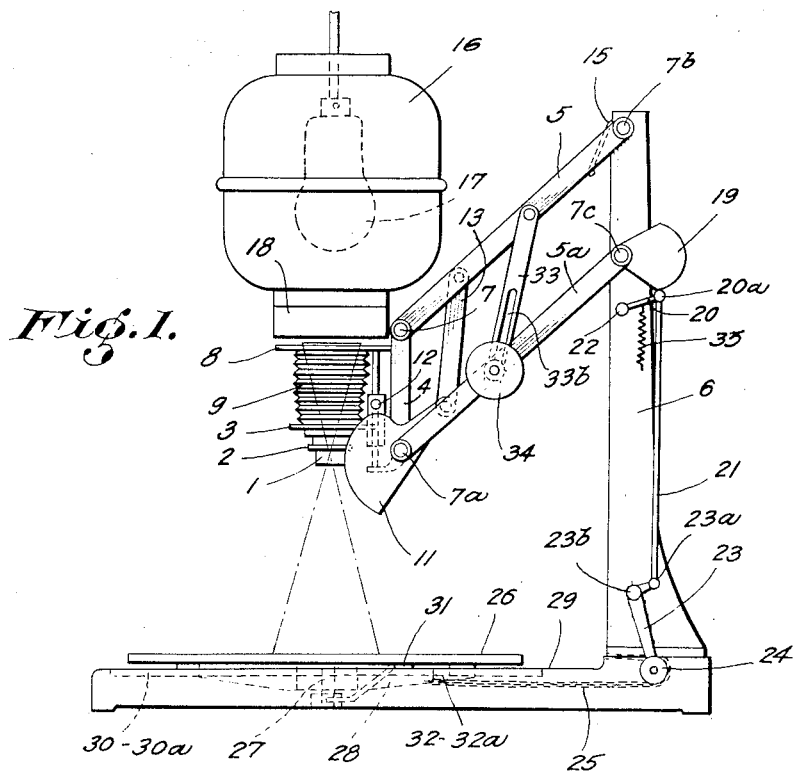
Figure 1 is an elevation of an automatic enlarger on an increased scale.

Referring now to the drawings in detail, a lens 1 is threadably mounted in a movable lens carrier 3 by means of a threaded collar 2 which permits adjustment of the initial focal distance. A bracket 4 is connected to a system of spaced parallel levers consisting of an upper lever 5 and a lower lever 5a. Said levers 5 and 5a are pivotally connected by means of pins 7, 7a, 7b, and 7c, and are held in any desired position by the locking arm 33 pivotally connected at the top to lever 5 and adjustably and pivotally connected to lever 5a at the bottom. The slot 33b in the end of the arm 33, co-acting with a removable fastener, permits locking as desired.

A negative-carrying stage 8 is connected to lens carrier 3 by a bellows 9, while the lens carrier 3 is slidable on the cylindrical rod 10, and has a projecting roller 12 for co-operating with a cam 11 hereinafter more fully described.

Cam 11, pivoted at 7a, is pivotally connected to the cam rod 13, which in turn is pivotally connected to the lever 5 by the pin 14 as shown in Figure 1.

The upper part of the enlarger is formed in the usual manner and consists of a casing 16 containing a lamp 17 and a condenser 18.

In operation, when the enlarger is raised vertically from the low position, the cam rod 13 rotates cam 11 clockwise about its pivot. The curvature of the cam 11 is such that the roller 12 is gradually raised carrying with it the lens carrier 3, and thereby automatically adjusting the focal distance between the objective and the object to be enlarged. In this case the bellows is folded on itself bringing the lens carrier 3 closer to the negative-carrying stage 8.

Figure 2:
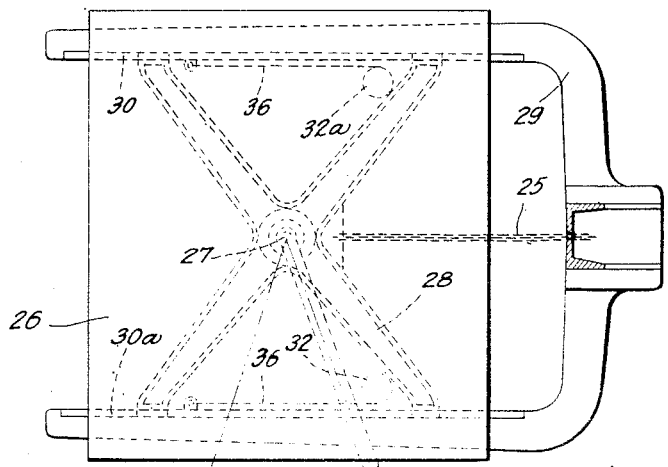
Figure 2 is a plan of the movable and rotary projection platform.

It is apparent that during the vertical movement of the enlarger its horizontal distance with respect to the standard 6 and to the easel 26 varies. If this variation with respect to the easel is not automatically compensated for, then the operator of the device must manually adjust the easel with respect to the enlarger after each movement of the same. Figures 1 and 2 illustrate an arrangement whereby movement of the enlarger is transmitted to the easel, maintaining the center of the easel in line with the center of the enlarger.

As shown in Figure 1, a cam 19 is mounted to rotate with the lever 5a. A lever 20 is pivotally connected to standard 6 at 22 and carries at its free end a roller 20a and one end of a lever 21. A spring 35 pressing against lever 20 maintains the roller 20a against the cam 19. The other end of lever 21 is pivotally connected to one end of an L-shaped arm 23 which is pivotally connected to a U-shaped member 29, the arms of which have tracks or slideways 30 and 30a formed therein. An X-shaped cradle or easel support 28 is slidably mounted on said slideways 30 and 30a. A cable, as chain 25 or the like, is connected at one end to member 29 and at the other end to cradle 28 over roller 24. Cables 36 are connected at one end to the arms of member 29, and at their other ends to spring-loaded rollers 32 and 32a rotatably mounted on said cradle or easel support 28, and constantly urge said support 28 away from the standard 6. An easel 26 is mounted on and carried by the support 28.

In operation, when the enlarger is raised, the cam 19 is rotated clockwise and depresses lever 21 which in turn rotates the L-shaped arm 23 about its pivot 23b in a clockwise direction. This movement of the arm 23 carries the roller 24 to the left as viewed in Figure 1, permitting the easel support and easel to be drawn to the left under the action of the cables 36. It is apparent that the curvature of cam 19 is such as to precisely move the easel in accordance with the horizontal displacement of the enlarger. As the enlarger continues upward past the horizontal position of the system of parallel levers, the enlarger is displaced horizontally back toward the standard 6, and cam 19 permits lever 21 to be raised through the expansion of spring 35.

Having now particularly described and ascertained the nature of my invention, and in what manner the same is to be performed, I declare that what I claim is:

An automatic enlarging apparatus comprising, in combination, a lens carrier, a bellows, and a stage, a standard, a system of parallel spaced levers having one of their ends pivotally connected to said standard and the other pivotally connected to a bracket on the enlarging apparatus, an easel disposed below the enlarging apparatus, means on said system intermediate the ends thereof for releasably clamping the same in any adjusted position, and means connected to turning point on the standard in operative engagement with the easel for varying the position of said easel in accordance with the horizontal displacement of said enlarging apparatus; said last mentioned means comprising a cam connected to the end of one of the levers of said system at the standard, a lever movably connected at its upper end to said standard and in operative engagement with said cam and adapted to be moved downwardly by the same, an L-shaped lever pivotally mounted on said standard and connected at one end to said lever, a roller carried by the other end of said L-shaped lever, a U-shaped member having a pair of slideways one formed on either arm, said standard being mounted on said U-shaped member, a cradle slidable on said U-shaped member, said easel being mounted on said cradle, means connected to said cradle and said standard and in engagement with said roller for moving said cradle toward said standard, resilient means connected to said cradle and to said U-shaped member urging said cradle away from said standard, and another resilient means connected to said standard and said lever urging said lever upwardly and against said cam.

ROBERT PASQUET.

REFERENCES CITED

The following references are of record in the file of this patent:

UNITED STATES PATENTS

| Number | Name | Date |
| --- | --- | --- |
| 1,623,538 | Hopkins | Apr. 5, 1927 |
| 2,043,970 | Luz | June 9, 1936 |
| 2,133,581 | Simmon | Oct. 18, 1938 |
| 2,133,978 | Draeger | Oct. 25, 1938 |
| 2,141,176 | Draeger | Dec. 27, 1938 |